US011521216B2

(12) United States Patent
Geissele et al.

(10) Patent No.: US 11,521,216 B2
(45) Date of Patent: Dec. 6, 2022

(54) FIREARM OWNERSHIP PROGRAM

(71) Applicant: WHG Properties, LLC, North Wales, PA (US)

(72) Inventors: William H. Geissele, Lower Gwynedd, PA (US); Joseph Plunkett, Jr., Clifton Heights, PA (US)

(73) Assignee: WHG Properties, LLC, North Wales, PA (US)

( * ) Notice: Subject to any disclaimer, the term of this patent is extended or adjusted under 35 U.S.C. 154(b) by 289 days.

(21) Appl. No.: 17/000,405

(22) Filed: Aug. 24, 2020

(65) Prior Publication Data

US 2021/0065211 A1 Mar. 4, 2021

Related U.S. Application Data

(60) Provisional application No. 62/891,763, filed on Aug. 26, 2019.

(51) Int. Cl.
| | |
|---|---|
| *G06Q 30/00* | (2012.01) |
| *G06Q 10/08* | (2012.01) |
| *G06Q 30/06* | (2012.01) |
| *G06V 10/75* | (2022.01) |
| *G06V 20/80* | (2022.01) |
| *G06K 7/14* | (2006.01) |
| *G06K 7/10* | (2006.01) |

(52) U.S. Cl.
CPC ..... *G06Q 30/0185* (2013.01); *G06K 7/10722* (2013.01); *G06K 7/1417* (2013.01); *G06Q 10/087* (2013.01); *G06Q 10/0837* (2013.01); *G06Q 10/0838* (2013.01); *G06Q 30/012* (2013.01); *G06Q 30/0635* (2013.01); *G06Q 30/0645* (2013.01); *G06V 10/751* (2022.01); *G06V 20/80* (2022.01)

(58) Field of Classification Search
None
See application file for complete search history.

(56) References Cited

U.S. PATENT DOCUMENTS

| | | | | |
|---|---|---|---|---|
| 3,778,781 | A  * | 12/1973 | Roth | G06Q 10/087 348/160 |
| 6,681,677 | B2 * | 1/2004 | Herring | F41A 5/26 89/33.14 |
| 9,823,031 | B2 * | 11/2017 | Robbins | F41A 11/02 |
| 2003/0136041 | A1 * | 7/2003 | Herring | F41A 5/26 42/18 |
| 2012/0167433 | A1 * | 7/2012 | Robbins | F41A 11/02 42/75.02 |
| 2017/0236229 | A1 * | 8/2017 | Roof | G06Q 50/26 705/345 |
| 2017/0270628 | A1 * | 9/2017 | Roof | G06V 30/416 |
| 2019/0024996 | A1 * | 1/2019 | Borges | F41A 3/54 |

OTHER PUBLICATIONS

Rondinone, N., et al., "Police Briefs," Hartford Courant [Hartford, Connecticut] Feb. 3, 2016: B.4. (Year: 2016).*
Hohmann, J., "The Daily 202: Police officers keep getting shot by people with criminal records who are not allowed to own guns," WP Company LLC d/b/a The Washington Post, Aug. 15, 2019. (Year: 2019).*

* cited by examiner

*Primary Examiner* — Nicholas D Rosen
(74) *Attorney, Agent, or Firm* — Fox Rothschild LLP

(57) ABSTRACT

The disclosure relates to tracking ownership of a firearm, and more particularly, to leasing and repossessing a firearm.

22 Claims, 4 Drawing Sheets

FIREARM OWNERSHIP PROGRAM

This application claims the benefit of priority to U.S. patent application Ser. No. 62/891,763 filed Aug. 26, 2019, the disclosure of which is hereby incorporated by reference in its entirety.

BACKGROUND

Various laws and regulations require that an entity keep accurate records of the firearms in its possession. Typically, the entity records where the entity acquired the firearm and where the entity transferred the firearm. For example, a retail store may acquire a firearm from a distributor, and the retail store may subsequently sell the firearm to a customer. To keep a record of the firearm transfer, the retail store may log in a record that it acquired the firearm from the distributor, and that it transferred the firearm to the customer, indicating that the retail store is no longer in possession of the firearm.

The information that the entity logs into its records typically includes information related to the firearm, such as the product name of the firearm, style of firearm, registration number of the firearm, where the firearm was acquired, and where the firearm was dispositioned. However, the information generally does not include a chain of title between entities indicating how the firearm transferred from a series of entities. For example, retail store may log that it acquired the firearm from a distributor and transferred to the customer. Thus, the retail store's record does not indicate where the distributor acquired the firearm. Accordingly, when a government agency, such as the Bureau of the Alcohol, Tobacco, Firearms and Explosives (the ATF), attempts to track down the entity or person in possession of a firearm, the government authority may have to individually inspect the records of each entity who was in possession of the firearm to determine who is last in possession of the firearm. For example, if there is an incident with a firearm, the ATF may start with a manufacturer of the firearm to review the record of where the firearm was transferred. Assuming the firearm was transferred to a distributor, the ATF may visit the distributor to review the distributor's records for the firearm to determine that the firearm was transferred to the retail store. From the seller's records, the ATF may determine the customer who purchased the firearm.

Moreover, the information that the entity logs into its records may not include the type of transaction, such as whether the transfer of the firearm was permanent or only temporary. Therefore, a government agency does not have a way to determine whether the transfer of the firearm was permanent or only temporary.

SUMMARY

The present disclosure relates generally to tracking ownership of a firearm, and more particularly, to leasing and repossessing a firearm.

In one or more cases, the disclosed technology relates to a computer program product including a non-transitory computer-readable storage medium having program instructions embodied therewith for repossessing a firearm dispositioned from a company to a customer via an agreement, in which the program instructions are executable by one or more processors. In one or more cases, the program instructions include imaging a unique identifier of an individual part of the firearm. In one or more cases, the program instructions include determining whether the imaged unique identifier of the individual part can be authenticated to a stored image of an original unique identifier by comparing the imaged unique identifier to the stored image of the original unique identifier. In one or more cases, the program instructions include determining, in response to failing to authenticate the feature of the imaged unique identifier, that the agreement dispositioning the firearm to the customer is violated. In one or more cases, the program instructions include reacquiring the firearm.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description.

DETAILED DESCRIPTION

Figure 1:
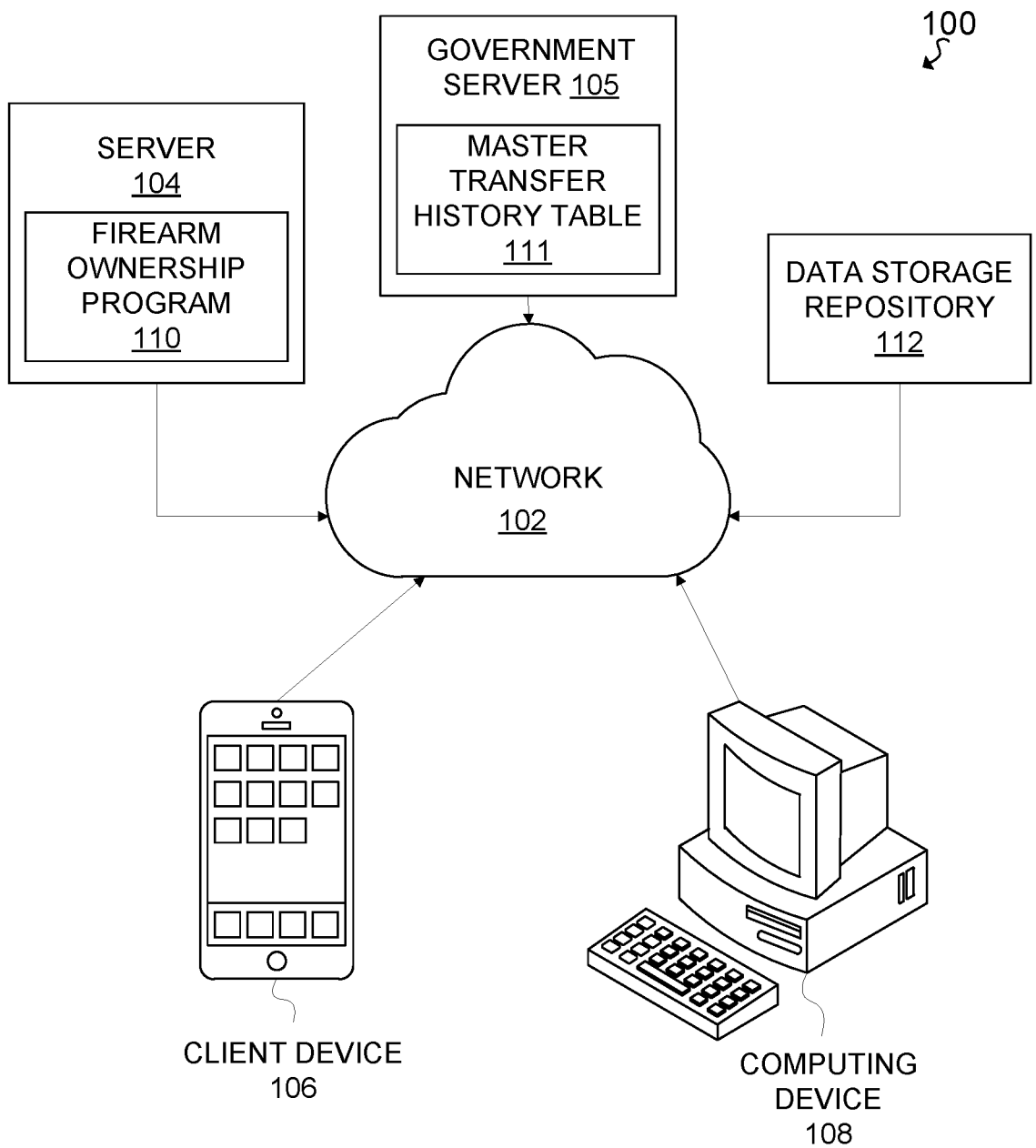
FIG. 1 is a functional block diagram illustrating a data processing environment.

In the following detailed description, numerous details are set forth in order to provide an understanding of the firearm ownership program, however, it will be understood by those skilled in the art that different and numerous embodiments of the firearm ownership program and the method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The following detailed description omits or only briefly describes conventional features of the data processing environment configured to operate the firearm ownership program, which are apparent to those skilled in the art. Moreover, unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, steps, operations, elements, and/or components, but do not preclude the presence or addition of one or more other features, steps, operations, elements, components, and/or groups thereof.

Government authorities currently do not have a method of tracking transfers of a firearm between one or more companies and/or between a company and a customer. For example, a firearm may transfer from a manufacturer to a distributor, from a distributor to a store, and from a store to a customer. Yet, there currently is no method of tracking the transfer of a firearm and viewing a history of firearm being transferred between one or more companies and/or between a company and a customer. Additionally, government agencies do not have a method of determining whether a transfer of a firearm was permanent or temporary, nor do the agencies have a method of tracking temporary transfers of a firearm. For example, there may be cases in which the owner of a firearm desires to maintain ownership of the firearm but grant permission to another person or entity to temporarily use and/or possess the firearm. In another example, there may be cases in which a company desires to lease a firearm to a customer. Yet, there currently is no method of temporarily transferring a firearm to another person while allowing the owner to maintain legal ownership of the firearm. Consequently, as the government authority is unaware of such temporary transfers, the owner of the firearm assumes certain risks when temporarily lending the firearm to the other person. Moreover, the person granted temporary possession of the firearm may risk not being able to prove that he was granted permission to temporarily possess the firearm.

Embodiments disclosed herein relate generally to tracking ownership of a firearm, and more particularly, to leasing a firearm and to repossessing a firearm should a customer violate a lease agreement. The embodiments are described below with reference to FIGS. 1-4.

FIG. 1 is a functional block diagram illustrating a data processing environment 100. FIG. 1 provides only an illustration of one implementation and does not imply any limitations with regard to the environments in which different embodiments may be implemented. Many modifications to the depicted environment may be made by those skilled in the art without departing from the scope of the embodiments herein. The data processing environment 100 includes a network 102, a server 104, which operates a firearm ownership program 110, and one or more devices, such as a client device 106 and a computing device 108. In one or more cases, a business entity that sells and leases firearms ("selling company") may operate the firearm ownership program 110 via the components in the data processing environment 100. The selling company may be, for example, but not limited to, a manufacturing company, a distributor, a store such as a retail store, or the like. In one or more other cases, another business entity that leases firearms ("leasing company") may operate the firearm ownership program 110 via the components in the data processing environment 100.

The network 102 can be, for example, a local area network (LAN), a telecommunications network, a wide area network (WAN), such as the Internet, a virtual local area network (VLAN), or any combination that can include wired, wireless, or fiber optic connections. The network 102 can also include wire cables, wireless communication links, fiber optic cables, routers, switches and/or firewalls. The network 102 interconnects the server 104, the client device 106, and the computing device 108. In general, the network 102 can be any combination of connections and protocols capable of supporting communications between the server 104, the client device 106, the computing device 108, and the firearm ownership program 110.

The server 104 is a web-based server hosting firearm ownership program 110. In one or more cases, the server 104 can be a web server, a blade server, a computer including one or more processors and at least one non-transitory computer readable memory, a mobile computing device, a laptop computer, a tablet computer, a netbook computer, a personal computer (PC), a desktop computer, or any programmable electronic device or computing system capable of receiving and sending data, via the network 102, and performing computer-readable program instructions. In one or more cases, the server 104 can be a data center, consisting of a collection of networks and servers providing an IT service, such as virtual servers and applications deployed on virtual servers, to an external party. In one or more cases, the server 104 represents a computing system utilizing clustered computers and components (e.g., database server computer, application server computers, etc.) that act as a single pool of seamless resources, such as in a cloud computing environment, when accessed within the data processing environment 100.

In one or more cases, the server 104 includes a data storage repository 112 for storing data including, but not limited to, purchase orders, customer information, product identification numbers, inventory of available and/or unavailable products, one or more transfer history tables, unique identifiers in which numbers, characters, phrases, symbols, and/or quick response (QR) codes of a scanned image are engraved, cast, stamped, or printed to the individual parts of the firearm. The data storage repository 112 can be one of, a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with the server 104, the client device 106, and the computing device 108, via the network 102. In one or more cases, data storage repository 112 can represent virtual instances operating on a computing system utilizing clustered computers and components (e.g., database server computer, application server computers, etc.) that act as a single pool of seamless resources when accessed within the data processing environment 100.

In one or more cases, the firearm ownership program 110 operates on a central server, such as the server 104, and can be utilized by one or more devices, such as the client device 106 and the computing device 108, via an application downloaded from the central server or a third-party application store, and executed on the one or more client devices. In one or more cases, the firearm ownership program 110 may be a software-based program, downloaded from a central server, such as the server 104, and installed on one or more devices, such as the client device 106 and the computing device 108. In one or more cases, the firearm ownership program 110 can be utilized as a software service provided by a third-party cloud service provider (not shown). In one or more cases, the firearm ownership program 110 may be stored on a removable storage device, such as a USB flash drive, and downloaded onto the server 104, the client device 106, and/or the computing device 108.

In one or more cases, client device 106 and computing device 108 are clients to server 104 and can be, for example, a desktop computer, a laptop computer, a tablet computer, a personal digital assistant (PDA), a smart phone, a thin client, or any other electronic device or computing system capable of communicating with the server 104 through the network 102. In one or more cases, the client device 106 and/or the computing device 108 can be configured with a camera or another type of imaging device suitable for acquiring images, such as, for example, images of unique identifiers located on individual parts of a firearm. In one or more cases, the client device 106 and/or the computing device 108 can be configured with a 3-dimensional (3D) scanner. The 3D scanner, for example, but not limited to, a structured-light 3D scanner, may be configured to measure variations in depth of an object to evaluate one or more features of the object. For example, the 3D scanner may be used to measure variations in depth of a wear marker, stamps, and/or engravings. In other cases, client device 106 and computing device 108 can be any suitable types of mobile devices capable of running mobile applications, including smart phones, tablets, slate, or any type of device that runs a mobile operating system. For example, the client device 106 may be a mobile device operated by a customer and capable of connecting to a network, such as the network 102, to access the internet to, for example, register serial numbers, transfer and/or request temporary ownership of a firearm, make lease payments, access the firearm ownership program 110, etc. In another example in which the client device 106 is a mobile device, an employee of the selling company or leasing company may, using a camera of the client device 106, take images of a serialized portion of one or more individual parts of a firearm, and upload the images to the firearm ownership program 110. In another example in which the computing device 108 is a laptop computer, an employee of the selling company or the leasing company may use the computing device 108 to access the internet to, for example, register serial numbers, retrieve temporary ownership of a firearm, issue repossession notifications, update products and/or firearms within the selling company's inventory, access the firearm ownership program 110, etc. In yet other cases, the client device 106 and the computing device 108 can represent virtual instances operating on a computing system utilizing clustered computers and components (e.g., database server computer, application server computers, etc.) that act as a single pool of seamless resources when accessed within the data processing environment 100.

In one or more cases, the client device 106 and the computing device 108 can include a user interface for providing an end user with the capability to interact with the firearm ownership program 110. For example, an end user may access the firearm ownership program 110 through the user interface to enable the firearm ownership program 110 to operate on the end user's device. A user interface refers to the information (such as graphic, text, and sound) a program presents to a user and the control sequences the user employs to control the program. In one embodiment, the user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation.

Figure 2:
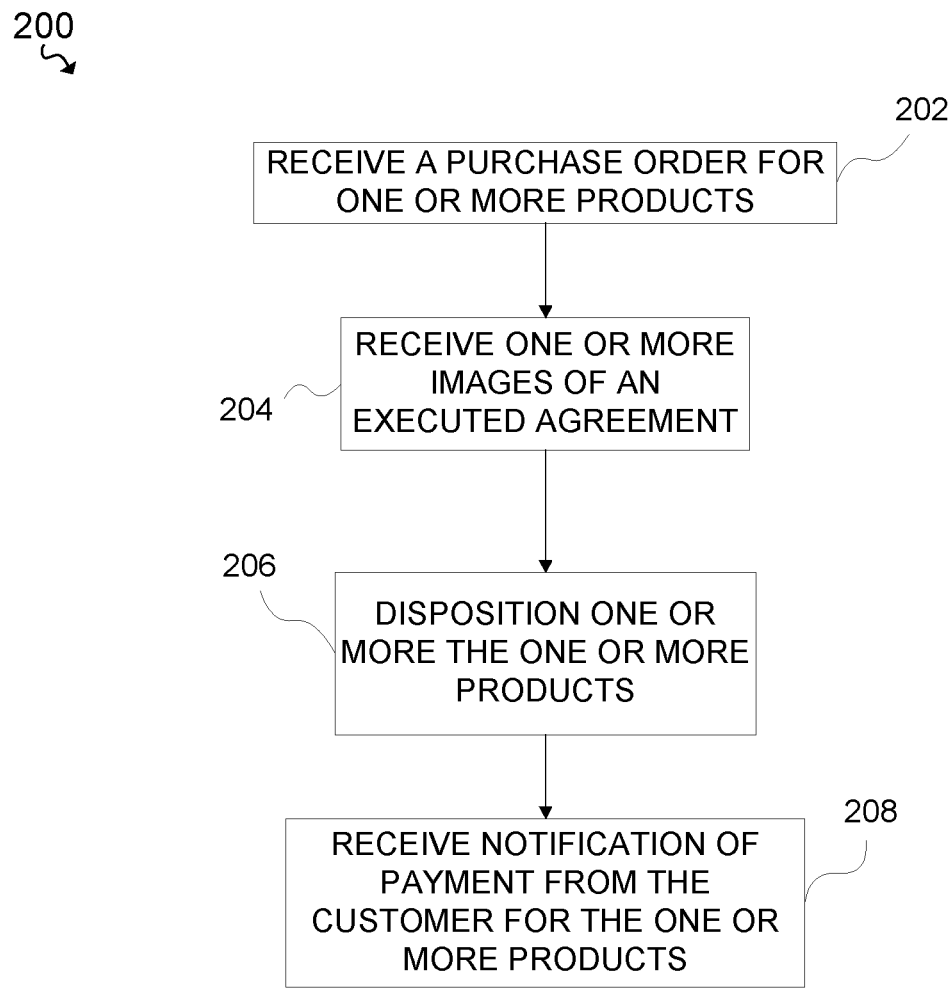
FIG. 2 is a flowchart illustrating operations of temporarily dispositioning one or more products.

FIG. 2 is a flowchart illustrating operations of temporarily dispositioning one or more products, generally designated 200. In one or more cases discussed herein, devices, such as the client device 106 and the computing device 108, can initiate one or more operations of temporarily dispositioning one or more products, such as firearms, via the firearm ownership program 110 by connecting to the server 104 via the network 102.

The firearm ownership program 110 receives a purchase order for one or more products (202), via the client device 106 or the computing device 108.

In one or more cases, the purchase order may be a request from one business entity to purchase a product from another business entity. For example, a customer, such as a distributor, may send a purchase order to a selling company, such as a manufacturer, to purchase one or products, such as firearms and/or accessories. In another example, a customer, such as a firearm store, may send a purchase order to a selling company, such as the distributor, to purchase a product, such as a firearm. The purchase order to purchase one or more products may include, for example, but not limited to, the type and quantity of firearms to be purchased, accessories for one or more firearms, the customer's contact information, and the selling company's contact information.

In one or more other cases, the purchase order may be a request from a customer to lease or rent one or more products, for example, firearms and/or accessories, from the selling company, such as the firearm store, for a determined period of time. For example, a customer may place a purchase order to lease one or more firearms on the selling company's website, via the customer's client device 106, in which the firearm ownership program 110 receives the purchase order to lease one or more firearms. In another example, the selling company may enter the customer's purchase order into the computing device 108, in which the firearm ownership program 110 receives the purchase order to lease one or more firearms. The purchase order to lease one or more products may include, for example, but not limited to, the type and quantity of firearms to be leased, accessories for one or more firearms, the customer's contact information, information required to complete a background check on the customer, a term for leasing the one or more firearms, and a time period for submitting lease payments. In one or more other cases, the purchase order may be a request to lease or rent one or more products, for example, firearms and/or accessories, from the leasing company for a determined period of time.

The firearm ownership program 110 determines whether the one or more products requested in the purchase order are available (i.e., whether the one or more products are in the selling company's inventory or accessible to the selling company). Each of the one or more products may include an identification number, such as, for example, a serial number, product number, and an ISBN. The identification numbers of the selling company's available products may be stored in the data storage repository 112. To determine the availability of the one or more requested products, the firearm ownership program 110 may be configured to search the data storage repository 112 to locate the availability of the one or more products based on the identification number. For example, the firearm ownership program 110 may search the data storage repository 112 and locate the identification numbers of the one or more firearms in the data storage repository 112. The firearm ownership program 110 notifies the customer that the purchase order is accepted when the identification number of the one or more products are identified as being available. For the cases in which the customer is not a business entity or a government entity and is, for example, a United States citizen, the firearm ownership program 110 issues a background check form to the customer for the customer to complete and submit for approval by the appropriate government agency. For the cases in which the customer is a government entity, the firearm ownership program 110 temporarily dispositions the one or more products to the customer as described herein.

In one or more cases in which the firearm ownership program 110 verifies that the one or more products in the purchase order are available, the purchaser may execute an agreement to acquire the one or more products. The selling company may scan the executed agreement, via the client device 106 or the computing device 108, and convert the executed agreement into one or more images. The selling company may upload the one or more images to the firearm ownership program 110. The firearm ownership program 110 may receive the one or more images of the executed agreement (204). In one or more cases, the firearm ownership program 110 may store the one or more images locally on the server 104 and/or the data storage repository 112. The firearm ownership program 110 may store the one or more images and a name or identifier of the customer who executed the agreement in a transfer history table stored in the data storage repository 112, as described herein.

In one or more cases, the transfer history table indicates the ownership status of the one or more products that are and/or were in the possession of the selling company and/or the customer. The one or more products may be listed within the transfer history table by, for example, but not limited to, the identification number of the product, the name of the customer, the type of disposition (e.g., via purchase or lease) to the customer, and whether or not the business entity is in possession of the one or more products. In one or more cases, the firearm ownership program 110 may append the one or more images of the executed agreement to the corresponding product within the transfer history table.

In one or more cases, each business entity may have its own transfer history table stored within its own data storage repository 112, such that other business entities do not have access to the information within the transfer history table. The firearm ownership program 110 updates the information of the product in the transfer history table for the business entity utilizing the firearm ownership program 110. For example, for the cases in which a selling company, such as a manufacturer, utilizes the firearm ownership program 110, the manufacturer may sell the product to a customer, such as a distributor. Accordingly, the firearm ownership program 110 may update the manufacturer's transfer history table to indicate that a product is sold and transferred to the distributor. If a government agency requests to see the transfer information for the product, the business entity may access the firearm ownership program 110 and the firearm ownership program 110 may retrieve the transfer history table, after which, the business entity may produce the transfer history table to the government agency. In one or more other cases, the transfer history tables for at least two business entities, connected via network 102, may be linked together such that as the firearm ownership program 110 updates the information for the one or more products in a transfer history table for a first business entity, the firearm ownership program 110 updates the information for the one or more products in a transfer history table for a second business entity. For example, when the firearm ownership program 110 updates the transfer history table for the selling company, such as a manufacturer, to indicate that a product is sold and transferred to the customer, the firearm ownership program 110 updates the transfer history table of the customer, such as the distributor, to indicate that the customer purchased the product from the selling company and that the customer is in possession of the product. It should be noted that a business entity may have its own transfer history table stored in its own data storage repository 112, and/or the business entity may have its own transfer history table stored on a data storage repository 112 shared by one or more other business entities.

In one or more cases, one or more transfer history tables for the one or more business entities may be linked, via the network 102, to a master transfer history table 111 that keeps track of the status of the one or more products. The one or more products may be listed within the master transfer history table 111 by, for example, but not limited to, the identification number of the product, the name of the customer, the name of the selling company, the type of disposition (e.g., via purchase or lease) from the selling company to the customer, and whether the selling company or the customer was last in possession of the one or more products. A government agency, such as the ATF, and/or state agency may have access to the master transfer history table 111. For example, a government agency operating computing device 108, may access the master transfer history table 111 on a government server 105, via the network 102. In one or more cases, the master history table 111 may be stored on the government server 105. In some cases, only a government agency can access the master transfer history table 111 via the government server 105. In one or more other cases, the government agency may grant access to one or more members to view the master transfer history table 111 via the government server 105. The government server 105 may have one or more of the same or similar features as server 104. Accordingly, a description of such features is not repeated. The information compiled in the master transfer history table 111 for the one or more products may provide the transfer history of a product as the product transfers between selling companies and customer(s), for example, a product being transferred from the manufacturer to the distributor, from the distributor to a store, and from the store to a person.

Having received the executed agreement, the firearm ownership program 110 dispositions the one or more products (206).

For the cases in which the customer, such as distributor, purchases the one or more products from the selling company, such as a manufacturer, the selling company dispositions the one or more products by transferring the one or products to the customer and notifying the firearm ownership program 110 of the transfer. For the cases in which the selling company, such as the manufacturer, operates the firearm ownership program 110, the firearm ownership program 110 may update the transfer history table to include information that the one or more products have been transferred to the customer and that the type of transfer was a purchase indicating that the selling company no longer owns or is in possession of the one or more products. For the cases in which, a customer, such as a distributor, operates the firearm ownership program 110, the firearm ownership program 110 may update the transfer history table to include information that the one or more products have been transferred to the customer and that the type of transfer was a purchase indicating that the customer owns and is in possession of the one or more products.

In one or more cases, when the one or more products are dispositioned from the selling company to the customer, such as a firearm store, the firearm ownership program 110 may link the information in the transfer history tables of the selling company and the customer for the one or more products based on an identification number of the one or more products, such as a serial number on a firearm. The firearm ownership program 110 may link the information regarding the one or more products in the transfer history tables, based on the identification numbers, such that as information of a product is updated in one transfer history table, the corresponding information in another transfer history table is updated. In one or more cases, the corresponding information in the other transfer history table may be updated in real-time, at a predetermined time, or based on a user selection. In one or more cases, the firearm ownership program 110 may update the information for the one or more products in the transfer history tables regarding the transfer between the selling company and the customer. For example, when the customer, such as the firearm store, purchases one or more firearms from the selling company, such as the distributor, the firearm ownership program 110 may update the transfer history tables of the customer and/or the selling company to indicate that one or more products transferred from the distributor to the firearm store, the type of transfer was a purchase, and that the firearm store owns and is in possession of the one or more firearms. The firearm ownership program 110 updates the transfer history table of the firearm store, to indicate that the firearm store purchased one or more products from the distributor, and that the firearm store is in possession of the one or more products. The firearm ownership program 110 may also update the transfer history table of the distributor to indicate that the one or more products were sold to the firearm store and that the firearm store is in possession of the one or more products.

In one or more cases, the firearm ownership program 110 may update the status of the one or more products for each transfer history table stored on the respective data storage repository 112. In such cases, each business entity may view the transfer history table to determine who possesses the one or more products and how the one or more products transferred between parties. Thus, a business entity, operating the firearm ownership program 110, may see the chain of transfers between one or more business entities. In one or more other cases, the firearm ownership program 110 may update the status of the transfer on the one or more products for the transfer history tables between the selling company and the customer, such that other business entities outside of this transaction cannot see the transfer history of the one or more products.

In one or more cases, a government agency may have access to the master transfer history table 111, in which the firearm ownership program 110 updates the master transfer history table 111 for each transaction of the one or more products, thereby allowing the government agency to view the chain of transfers between one or more business entities, such as from the manufacturer to the distributor, from the distributor to the firearm store, and so forth. In one or more cases, the master transfer history table 111 may include information related to the one or more products dispositioned via the firearm ownership program 110. In one or more other cases, the master transfer history table 111 may only include one or more products (e.g., short barreled rifles, suppressors, etc.) that are subject to the National Firearms Act.

For the cases in which the customer, such as a consumer or police department, leases the one or more products from the selling company, such as the manufacturer, distributor, or firearm store, the selling company dispositions the one or more products by transferring the one or products to the customer and notifying the firearm ownership program 110 of the transfer. For the cases in which the selling company operates the firearm ownership program 110, the firearm ownership program 110 may update the transfer history table to include information that the one or more products have been transferred to the customer, that the type of transfer was a lease indicating that the selling company owns the one or more products, and that the customer is in temporary possession of the one or more products.

In one or more cases in which the one or more products are dispositioned to a customer, via purchasing, the firearm ownership program 110 may receive notification concerning that the payment was received from the customer for the one or more products (208). In one or more other cases, in which the one or more products are dispositioned to a customer, via leasing, when the lease term or rental period for the one or more products begins, the firearm ownership program 110 may receive notification concerning that the lease payment was received from the customer for the one or more products (208). In one or more cases, the customer may submit payment(s) to the firearm ownership program 110 by accessing the selling company's website or payment portal. The customer may access the selling company's website or payment portal via the customer's client device 106 and/or computing device 108.

In one or more cases, the selling company may optionally choose to sell the one or more products requested in the purchase order to the leasing company. In a case in which the leasing company purchases the one or more products, the leasing company, via the firearm ownership program 110, obtains ownership of the one or more products from the selling company, the leasing company leases the one or more products requested in the purchase order to the customer, the customer receives the dispositioned one or more products as described above, and the customer makes payments for the one or more products to the lease company. In one or more other cases, the selling company may interface with the customer to determine a purchase order for leasing one or more products. Having determined the purchase order, the selling company, via the firearm ownership program 110, transfers the purchase order to the leasing company. The leasing company, via the firearm ownership program 110, obtains ownership to the one or more products from the selling company. The leasing company leases the one or more products requested in the purchase order to the customer. The customer obtains temporary possession of the one or more products. The customer makes payments for the one or more products to the leasing company. Additionally, the leasing company, via the firearm ownership program 110, may perform one or more operations of repossessing the one or more products as discussed herein.

In one or more cases, the leasing company offers products from one or more companies other than or in addition to the one or more products offered by the selling company. For example, for the cases in which the customer requests a product that the selling company does not produce and/or have in inventory, the selling company may identify and provide a quote for the product from another company. The leasing company may receive a purchase order for the product, purchase and/or acquire the product from the other company, and lease, via the firearm ownership program 110, the product to the customer as described herein.

Figure 3:
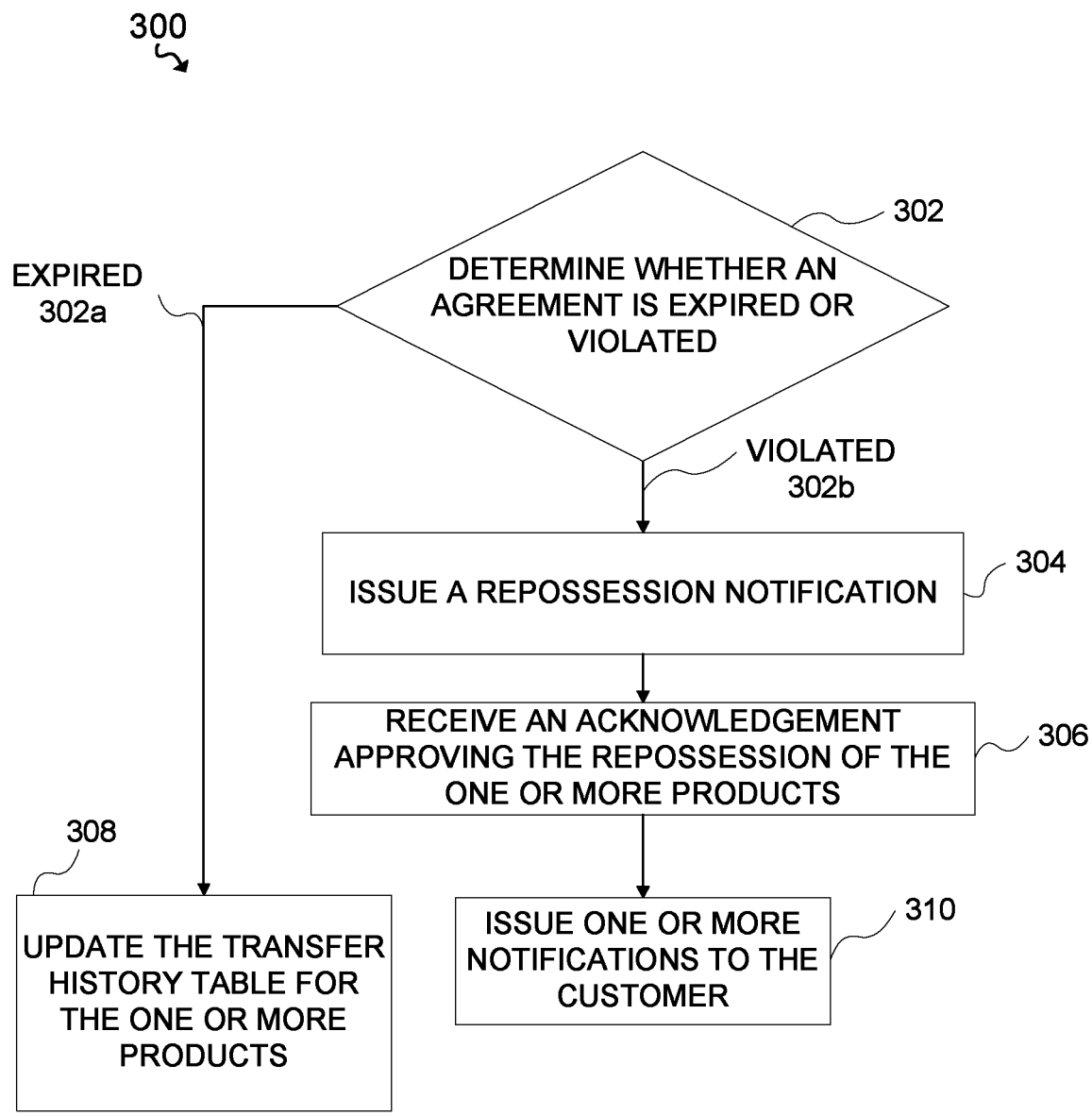
FIG. 3 is a flowchart illustrating operations of repossessing the one or more products.

FIG. 3 is a flowchart illustrating operations of repossessing the one or more products, generally designated 300. In one or more cases discussed herein, devices, such as client device 106 and computing device 108, can initiate one or more operations of repossessing the one or more products, such as firearms, via the firearm ownership program 110 by connecting to the server 104 via the network 102.

In one or more cases, the repossessing operations described herein may be initiated automatically. For example, this can occur when the firearm ownership program 110 determines that an agreement expired or was violated (302). The agreement may be, for example, a lease agreement or a rental agreement between the selling company, such as the firearm store, and the customer for the lease or rental of one or more products, such as firearms. The agreement may be, in another example, a lease agreement between the leasing company and the customer for the lease of one or more products. In one or more cases, the firearm ownership program 110 may determine that an agreement expired when the term of the agreement ends or the final date of the term passes. In one or more other cases, the firearm ownership program 110 may determine that a customer violated the agreement by defaulting on a payment, misusing the one or more products, failing to maintain the one or more products, or other breaches as may be designated in the agreement. For the one or more other cases in which a leasing company owns the lease to the one or more products, the firearm ownership program 110 may receive a notification from the leasing company that the customer is in violation of the lease.

In one or more cases, the agreement may require that the customer return the firearm(s) to the selling company to perform an inspection of the firearms, and thereafter, the selling company would return the firearm(s) to the customer. The maintenance inspection may occur during a time period designated by the agreement, e.g., once a year. During the inspection, the selling company may perform a full maintenance inspection of the firearm, clean the firearm, and/or take critical measurements of certain areas to verify an estimated round count to determine the number of rounds that were fired or can be fired using the firearm.

In addition to having a firearm serial number engraved, cast, or stamped on a respective portion of the firearm, the individual parts, such as the receiver or barrel, of the firearm may be serialized with a unique identifier. The unique identifier may include using one of or a combination of numbers, characters, phrases, symbols, QR codes, or the like. A copy of the unique identifier of an individual part of the firearm may be stored into the data storage repository.

In one or more cases, the agreement may be violated if the customer, without permission from the selling company or as permitted by the agreement, changes one or more individual parts of the firearm for other firearm parts. Prior to leasing the firearm to a customer, the unique identifiers of each of the individual parts of the firearm may be imaged and the imaged copies of the individual parts may be stored in the data storage repository 112. When the firearm is returned for inspection, the one or more unique identifiers of the individual parts of the firearm may be checked to determine whether the one or more of the individual parts returned for inspection are the same parts of the firearm that were originally leased to the customer. To check whether the individual parts returned for inspection correspond to the individual parts that were leased to the customer, the selling company may scan a unique identifier of an individual part and compare the scanned unique identifier to the copy of the unique identifier stored in the data storage repository 112.

When the selling company receives the firearm for inspection, an employee of the selling company may scan the unique identifiers of the individual parts of the firearm using the camera on the client device 106 to create an image of the unique identifier and may submit the image to the firearm ownership program 110 for comparison. For example, the employee may scan the unique identifier 0001 of a firearm barrel and may upload this image to the firearm ownership program 110. The firearm ownership program 110 may compare the image to the copy of the unique identifier stored in the data storage repository 112. For the cases in which the image corresponds to the copy of the unique identifier, e.g., 0001 stamped on the firearm barrel, the firearm ownership program 110 determines that the scanned individual part corresponds to the individual part that was leased to the customer. For the cases in which the image does not correspond to the unique identifier, e.g., 0011 stamped on the firearm barrel, or in which a unique identifier is not included on the individual part, the firearm ownership program 110 determines that the agreement was violated as discussed herein.

In one or more cases, the unique identifiers of the individual parts of the firearm may be engraved, cast, stamped, or printed to the individual parts in a manner unique to the selling company. For example, a unique identifier having one of or a combination of numbers, characters, and/or phrases may be engraved, cast stamped, or printed in a unique font on the individual part. When a unique identifier of an individual part corresponds to the copy of the unique identifier, the firearm ownership program 110 determines whether the numbers, characters, phrases, symbols, and/or QR codes of the image are engraved, cast, stamped, or printed in the manner and/or consistent with the manner unique to the selling company. For example, the firearm ownership program 110 analyzes the font of a serial number in the image and determines whether the font is unique to or consistent with the font used by the selling company.

For the cases, in which the font is unique to or consistent with the font use by the selling company, the firearm ownership program 110 determines that individual part was issued from the selling company and/or the customer did not modify the firearm with a different part. That is, the firearm ownership program 110 authenticates the scanned image against a known font to ensure the validity of the individual part. For the cases, in which the font is not unique to or consistent with the font used by the selling company, the firearm ownership program 110 issues a fraud prevention warning to the selling company. Having received the fraud prevention warning, the selling company may inspect the firearm in a more detailed manner to determine whether one or more individual parts of the firearm were modified and/or replaced. For the cases in which it is determined that one or more individual parts were modified, the selling company may determine that the agreement has been violated as discussed herein.

In one or more cases, the agreement may also be violated if a customer fires more rounds with the firearm than a round count agreed to in the agreement. A round count on the firearm may be calculated to determine how many rounds were fired using the firearm. In one or more cases, the round count may be determined during the firearm inspection. In one or more other cases, the round count may be determined at another time and/or event agreed to in the agreement.

In one or more cases, artificial wear markers may be a unique identifier integrated with certain parts of the firearm and may be used to indicate the round count. A component of the firearm that may wear through normal use, such as a bolt or firing pin, may be modified to include a wear marker. For example, one or more artificial wear markers may be integrated with one or more components of a bolt carrier group, e.g., a bearing rail, bolt, firing pin, cam pin, or the like, and/or one or more components or aspects of the barrel, e.g., the chamber, throat, gas port, groove dimensions, or the like. The artificial wear marker may include one or more grooves or recessed areas. The 3D scanner, integrated with the client device 106 and/or the computing device 108, may be used to measure the depth of the grooves or recessed areas, before the firearm is transferred and when it is received for inspection, to determine the round count. As rounds are fired using the firearm, one or more of the components of the firearm may move against the artificial wear marker causing the artificial wear marker to wear down after each round is fired. For example, as the bolt moves over an artificial wear marker when a round is fired, the height of the artificial wear marker may be gradually reduced with each fired round. In one or more cases, the artificial wear markers may include one or more wear bars having varying heights within the grooves or recessed areas. For example, a first wear bar may be positioned within a first recess and may have a first height, and a second wear bar may be positioned within a second recess and may have a second height that is smaller than the first height. The heights of the artificial wear markers may be used to indicate a degree to which a recessed or grooved portion of the artificial wear marker has been worn away. For example, if the height of the first recess wears down to the height of the first wear bar, than the artificial wear marker may indicate that the firearm fired about 50 rounds.

In one or more other cases, natural wear markers may be measured to estimate the round count. A natural wear marker may be an area on a component, for example, but not limited to, a bolt or firing pin, of the firearm that naturally wears as another component makes contact with the other component, such as the bolt. For example, dimensional measurements of one or more areas on one or more components of the firearm may be obtained during the inspection and compared to dimensional measurements obtained when the firearm was new or was initially delivered to the customer. The change in dimensional measurements may be used to estimate the round count.

The selling company may determine the amount of wear on the wear marker, i.e., an artificial wear marker and/or a natural wear marker, and therefore, determine the round count for the firearm. In one or more cases, to determine the amount of wear on the wear marker, the one or more wear markers may be imaged by the camera on the client device 106 and uploaded to the firearm ownership program 110. Through image processing, the firearm ownership program 110 may analyze the imaged wear marker and determine an amount of wear on the wear marker. To determine the amount of wear on the wear marker, the imaged wear marker may be compared to a wear marker that was imaged during a previous inspection, when the firearm was first assembled, and/or before the firearm is leased to the customer. For example, the height reduction of the wear marker may be determined by comparing the height of the imaged wear marker to the height of the wear marker before the firearm was leased to the customer. Based on the height difference, the selling company may determine a round count of the firearm.

In one or more cases, a round counter may be integrated with the firearm. The round counter may be configured to track the number of rounds that were fired through the firearm. The round counter may be configured to discern between an actual round fired and a dry fire, in order to track the number of rounds fired through the firearm, thereby providing an accurate round count.

For the cases in which the firearm ownership program 110 determines that the lease expired (302*a*), the firearm ownership program 110 updates the transfer history table for the one or more products (308). The firearm ownership program 110 may update the transfer history table of the selling company to indicate that the agreement expired and the selling company may retrieve the one or more products.

Once the one or more products are retrieved, the firearm ownership program 110 may update the transfer history table to indicate that the selling company is in possession of the one or more products.

For the cases in which the firearm ownership program 110 determines that the lease was violated (302*b*), the firearm ownership program 110 issues a repossession notification (304). In one or more cases, the firearm ownership program 110 may issue the repossession notification to a government agency and/or state agency. In one example, the repossession notification may include a copy of the agreement between the selling company and the customer, an explanation of how the customer violated the agreement, and a request to repossess the one or more products. In another example, for the cases in which a leasing company owns the lease to the one or more products, the repossession notification may include a copy of the lease agreement between the leasing company and the customer, an explanation of how the customer violated the lease agreement, and a request to repossess the one or more products. The government agency and/or state agency may review the request, and having approved the request, grant permission to the selling company to repossess the one or more products, or in cases in which the leasing company holds ownership to the one or more products, to the leasing company.

The firearm ownership program 110 receives an acknowledgement approving the repossession of the one or more products (306), preferably from the government agency and/or state agency. The firearm ownership program 110 may update the transfer history table to indicate that the selling company, or the leasing company for the cases in which the leasing company holds the ownership to the one or more products being repossessed, may repossess the one or more products.

Having received approval to repossess the one or more products, the firearm ownership program 110 issues one or more notifications to the customer (310). The notification may indicate that the agreement for the one or more products is no longer valid, and/or that the customer is in unlawful possession of the one or more products. For example, the notification may indicate that the agreement to lease the firearm has been violated and is no longer valid, and that the customer is in unlawful possession of the firearm. Moreover, the notification may indicate that the customer does not have permission to possess, either temporarily or permanently, the firearm. To receive possession of the one or more products, the customer may willingly return the one or more products to the selling company, or leasing company if applicable, or a government entity, such as local law enforcement, may assist the selling company, or leasing company if applicable, retrieve the one or more products.

Figure 4:
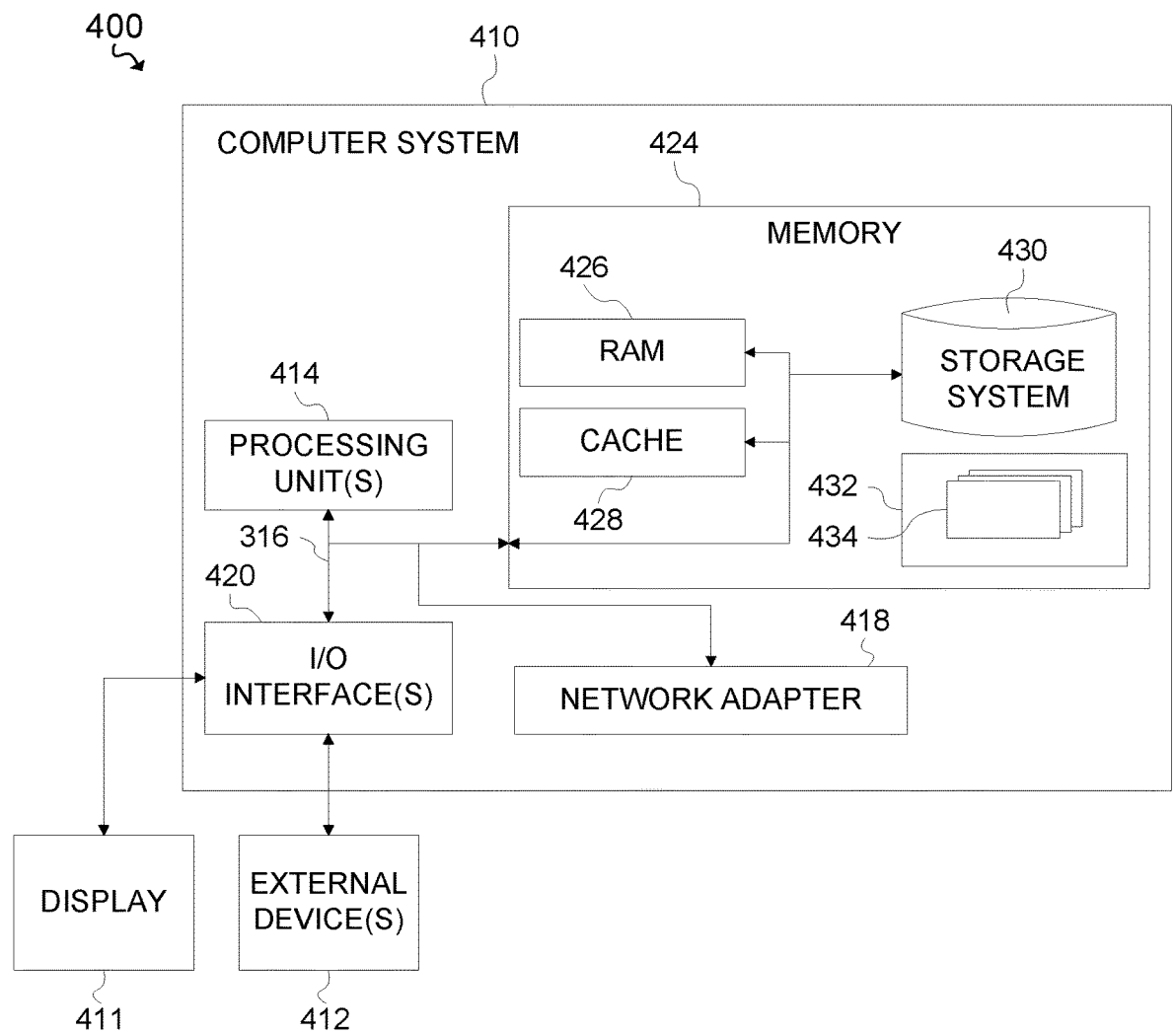
FIG. 4 is a block diagram depicting components of a data processing system (such as the server of FIG. 1).

FIG. 4 is a block diagram depicting components of a data processing system (such as the server of FIG. 1).

FIG. 4 is a block diagram depicting components of computing device capable of operating firearm ownership program 110, generally designated 400, in accordance with embodiments disclosed herein. FIG. 4 provides only an illustration of one implementation and does not imply any limitations with regard to the environments in that different embodiments may be implemented. Many modifications to the depicted environment may be made.

In an embodiment, server 104 in data processing environment 100 is shown in the form of a general-purpose computing device, such as computer system 410. The components of computer system 410 may include, but are not limited to, one or more processors or processing unit 414, memory 424, and bus 416 that couples various system components including memory 424 to processing unit 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media.

Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments as described herein. Computer system 410 may also communicate with one or more external device(s) 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The embodiments described herein may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a non-transitory computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A computer program product, comprising:
a non-transitory computer-readable storage medium having program instructions embodied therewith for repossessing a firearm dispositioned from a company to a customer via an agreement, the program instructions executable by one or more processors, the program instructions comprising instructions for:
imaging a unique identifier of an individual part of the firearm;
determining whether the imaged unique identifier of the individual part can be authenticated to a stored image of an original unique identifier by comparing the imaged unique identifier to the stored image of the original unique identifier;
determining, in response to failing to authenticate the imaged unique identifier, that the agreement dispositioning the firearm to the customer is violated; and
reacquiring the firearm.

2. The computer program product of claim 1, wherein the company maintains ownership of the firearm while the firearm is dispositioned to the customer.

3. The computer program product of claim 1, wherein the program instructions further comprise instructions for updating, when the company reacquires the firearm, a transfer history table to indicate that the company is in possession of the firearm.

4. The computer program product of claim 1, wherein the program instructions further comprise instructions for updating, when the company dispositions the firearm to the customer, a transfer history table to indicate that the company does not possess the firearm.

5. The computer program product of claim 1, wherein the program instructions further comprise instructions for issuing a repossession notification to an agency to repossess the firearm.

6. The computer program product of claim 1, wherein the unique identifier of the individual part comprises at least one of a number, character, phrase, symbol, and a quick response code.

7. The computer program product of claim 1, wherein the program instructions further comprise instructions for determining whether the imaged unique identifier of the individual part can be authenticated by comparing a feature of the imaged unique identifier to a feature of the stored image of the original unique identifier.

8. The computer program product of claim 7, wherein the unique identifier of the individual part comprises at least one of a number, character, and phrase, and
wherein the feature of the imaged unique identifier comprises a font.

9. The computer program product of claim 1, wherein the unique identifier comprises a wear marker integrated with the individual part of the firearm,
wherein the individual part is configured to wear down the wear marker, and
wherein an amount of wear of the wear marker corresponds approximately to a fired round count of the firearm.

10. The computer program product of claim 9, wherein the program instructions further comprise instructions for determining whether the imaged unique identifier of the individual part can be authenticated by comparing the amount of wear of the imaged unique identifier to an amount of wear shown by the stored image of the original unique identifier, and wherein authenticating the imaged unique identifier comprises verifying that the wear experienced by the firearm did not exceed a permissible amount of wear specified in the agreement.

11. The computer program product of claim 1, wherein the program instructions further comprise instructions for:

receiving an order for the firearm; and updating, when the company dispositions the firearm to the customer, a transfer history table to indicate that the company does not possess the firearm.

12. The computer program product of claim 11, wherein updating the transfer history table comprises designating that the transfer of the firearm is temporary.

13. A system for repossessing a firearm dispositioned from a company to a customer via an agreement, the system comprising:

a computer system comprising a processor, the processor configured to receive from an imaging device an acquired image of a unique identifier of an individual part of the firearm;

determine based on the acquired image whether the unique identifier of the individual part can be authenticated to an original unique identifier by comparing information concerning the unique identifier that is derived from the acquired image to the original unique identifier;

determine, in response to failing to authenticate the imaged unique identifier, that the agreement dispositioning the firearm to the customer is violated; and reacquire the firearm.

14. The system of claim 13, wherein the processor is configured to update, when the company reacquires the firearm, a transfer history table stored in a computer memory to indicate that the company is in possession of the firearm.

15. The system of claim 13, wherein the processor is configured to update, when the company dispositions the firearm to the customer, a transfer history table stored in a computer memory to indicate that the company does not possess the firearm.

16. The system of claim 13, wherein the processor is configured to automatically issue a repossession notification to an agency to repossess the firearm.

17. The system of claim 13, wherein the unique identifier of the individual part comprises at least one of a number, character, phrase, symbol, and a quick response code.

18. The system of claim 13, wherein the processor is configured to determine whether the imaged unique identifier of the individual part can be authenticated by comparing a feature of the imaged unique identifier to a feature of the stored image of the original unique identifier.

19. The system of claim 13, wherein the unique identifier comprises a physical wear marker structure that is integrated with the individual part of the firearm, wherein the individual part is configured to respond to operation of the firearm by causing wear upon the wear marker.

20. The system of claim 19, wherein the processor is configured to determine whether the individual part is authenticated by comparing the amount of wear evidenced by the wear marker to an amount of wear shown by the wear marker in the stored image of the original unique identifier, and wherein authenticating the imaged unique identifier comprises verifying that the amount of wear evidenced by the wear marker does not exceed a predetermined amount of wear permitted in the agreement.

21. The system of claim 13, wherein the processor is configured to:

receive an order for the firearm; and update, when the company dispositions the firearm to the customer, a transfer history table stored in a memory location to indicate that the company does not possess the firearm.

22. The system of claim 21, wherein updating the transfer history table comprises designating that the transfer of the firearm is temporary.

* * * * *